United States Patent
Wang

(10) Patent No.: US 6,220,274 B1
(45) Date of Patent: Apr. 24, 2001

(54) AIR VALVE CONNECTION HEAD OF INFLATION DEVICE WITH AIR STORAGE BOTTLE

(76) Inventor: Lo-Pin Wang, 16F-2, No. 17, Lane 52, Sec. 3, Re He Rd., Taichung (TW)

(*) Notice: Subject to any disclaimer, the term of this patent is extended or adjusted under 35 U.S.C. 154(b) by 0 days.

(21) Appl. No.: 09/578,033

(22) Filed: May 25, 2000

(51) Int. Cl.[7] ................................................. F16K 15/20
(52) U.S. Cl. ........................ 137/231; 222/5; 251/149.3; 251/102
(58) Field of Search .................... 137/223, 231; 222/5; 251/102, 110, 149.3, 149.8

(56) References Cited

U.S. PATENT DOCUMENTS

| | | | |
|---|---|---|---|
| 4,934,543 | * | 6/1990 | Schmidt ............................ 222/399 X |
| 5,012,954 | * | 5/1991 | Will ........................................ 222/5 X |
| 5,114,041 | * | 5/1992 | DiForte ................................. 222/5 X |
| 5,316,055 | * | 5/1994 | Brimmer ............................... 222/5 X |
| 5,947,172 | * | 9/1999 | Glotin .................................... 222/5 X |
| 5,950,985 | * | 9/1999 | Petterson ....................... 251/149.8 X |
| 5,975,109 | * | 11/1999 | Wu ........................................ 137/231 |
| 5,983,920 | * | 11/1999 | Gapinski et al. .................... 137/231 |
| 6,105,601 | * | 8/2000 | Wang .................................... 137/231 |
| 6,146,116 | * | 11/2000 | Wu et al. ......................... 137/231 X |

FOREIGN PATENT DOCUMENTS

| | | | |
|---|---|---|---|
| 3205264 | * | 8/1983 | (DE) ........................................ 222/5 |
| 2216514 | * | 1/1974 | (FR) ......................................... 222/5 |

* cited by examiner

*Primary Examiner*—John Rivell
*Assistant Examiner*—Meredith H Schoenfeld
(74) *Attorney, Agent, or Firm*—Browdy and Neimark

(57) ABSTRACT

An air valve connection head is designed to work with an inflation device comprising an air storage bottle in which the compressed air is kept. The air valve connection head comprises a housing which is provided with a receiving compartment, an elastic annular block disposed in the receiving compartment, and a press member disposed in the receiving compartment such that the press member urges the annular block. The housing is further provided with an insertion hole and an air hole extending from the insertion hole to the receiving compartment. A valve member is movably disposed in the insertion hole for obstructing the air hole. A handle is pivoted to the housing such that the handle is swiveled to push the press member to cause the elastic annular block to deform to lash the air valve of an inflatable object. As the press member is pushed to displace, an inclined plane of the press member extends into the receiving compartment to push back the valve member so as to relieve the air hole of being obstructed by the valve member.

11 Claims, 2 Drawing Sheets

AIR VALVE CONNECTION HEAD OF INFLATION DEVICE WITH AIR STORAGE BOTTLE

FIELD OF THE INVENTION

The present invention relates generally to an air valve connection head of an inflation device, and more particularly to an air valve connection head of an inflation device which is provided with an air storage bottle.

BACKGROUND OF THE INVENTION

The conventional bicycle air pumps are used to inflate the bicycle tires by compressing and pumping air into the bicycle tires. There is a new inflation device which is designed to inflate the bicycle tire without the compressing and the pumping actions. The inflation device is provided with an air storage bottle in which the compressed air is stored for inflating the bicycle tire. Such an inflation device as described above is complicated in construction, especially the air valve connection head of the inflation device.

SUMMARY OF THE INVENTION

The primary objective of the present invention is to provide an inflation device with an air valve connection head which is simple in construction and can be easily used. The air valve connection head of the present invention is intended to be an integral part of the inflation device comprising an air storage bottle in which the compressed air is kept.

The present invention comprises a housing, a base block, a penetrating member, a valve member, an elastic member, an elastic annular block, a press member, and a handle. The housing has a receiving compartment, which is provided at one end thereof with an engagement port, and at other end thereof with a through hole. The housing further has an insertion hole perpendicular to the receiving compartment. The insertion hole is used to receive the nozzle of the air storage bottle. The penetrating member is disposed in the insertion hole for piercing the sealed opening of the nozzle of the air storage bottle. The valve member is movably disposed in the insertion hole and is provided with a protuberance facing the air hole of the housing. The valve member is pushed by the compressed air to remain at the innermost end of the insertion hole such that the protuberance obstructs the air hole. The elastic annular block is disposed in the receiving compartment and is provided with a through hole. The press member is movably disposed in the receiving compartment such that one end of the press member urges the annular block. The press member is provided with a cavity and at least one guide hole in communication with the cavity. The press member is provided in the periphery thereof with an inclined plane which pushes the valve member to move toward the insertion hole at the time when the press member is moved toward the annular block. The handle is fastened pivotally to the housing for forcing the press member to displace.

DETAILED DESCRIPTION OF THE INVENTION

Figure 1:
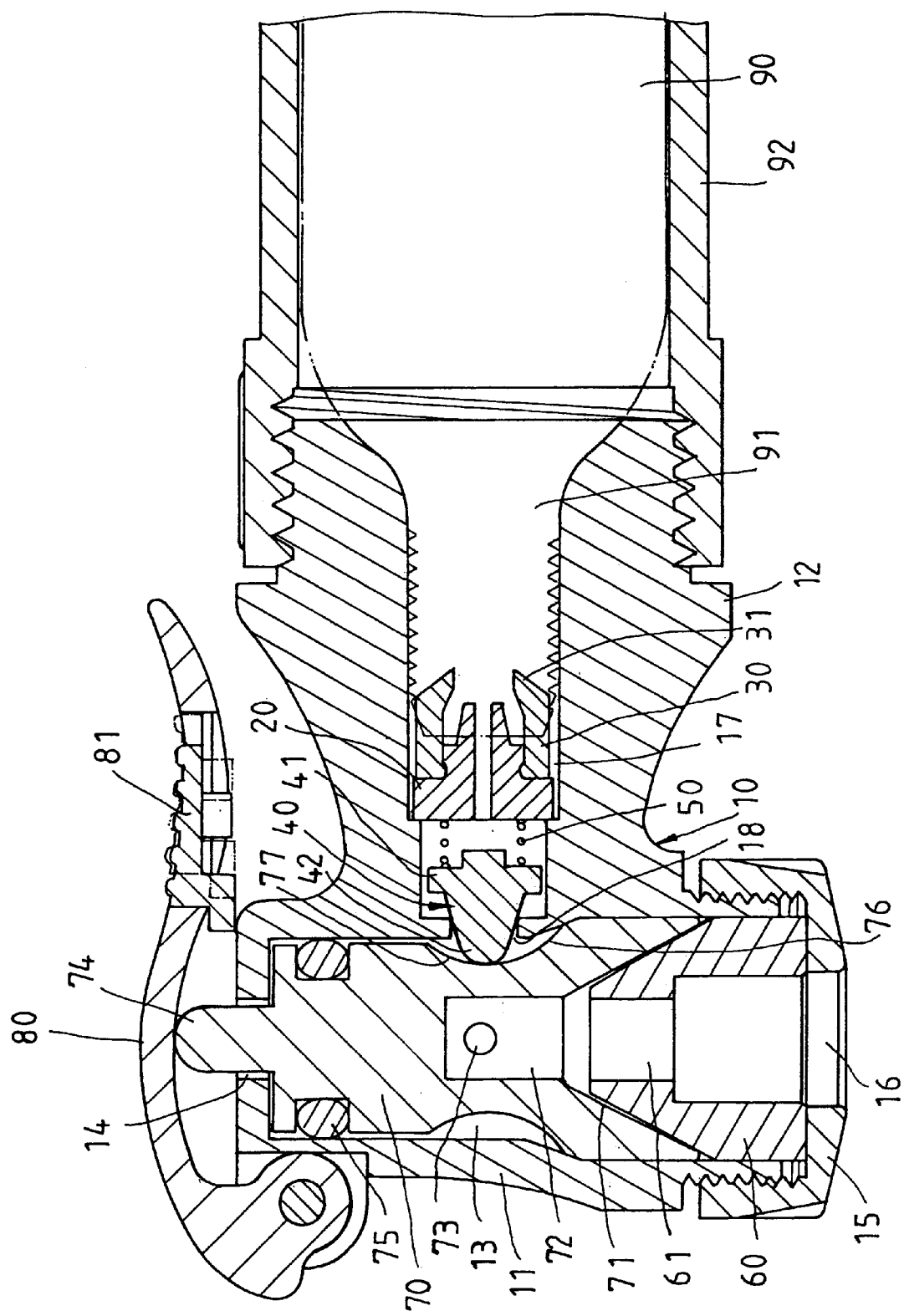
FIG. 1 shows a side sectional view of the present invention.
Figure 2:
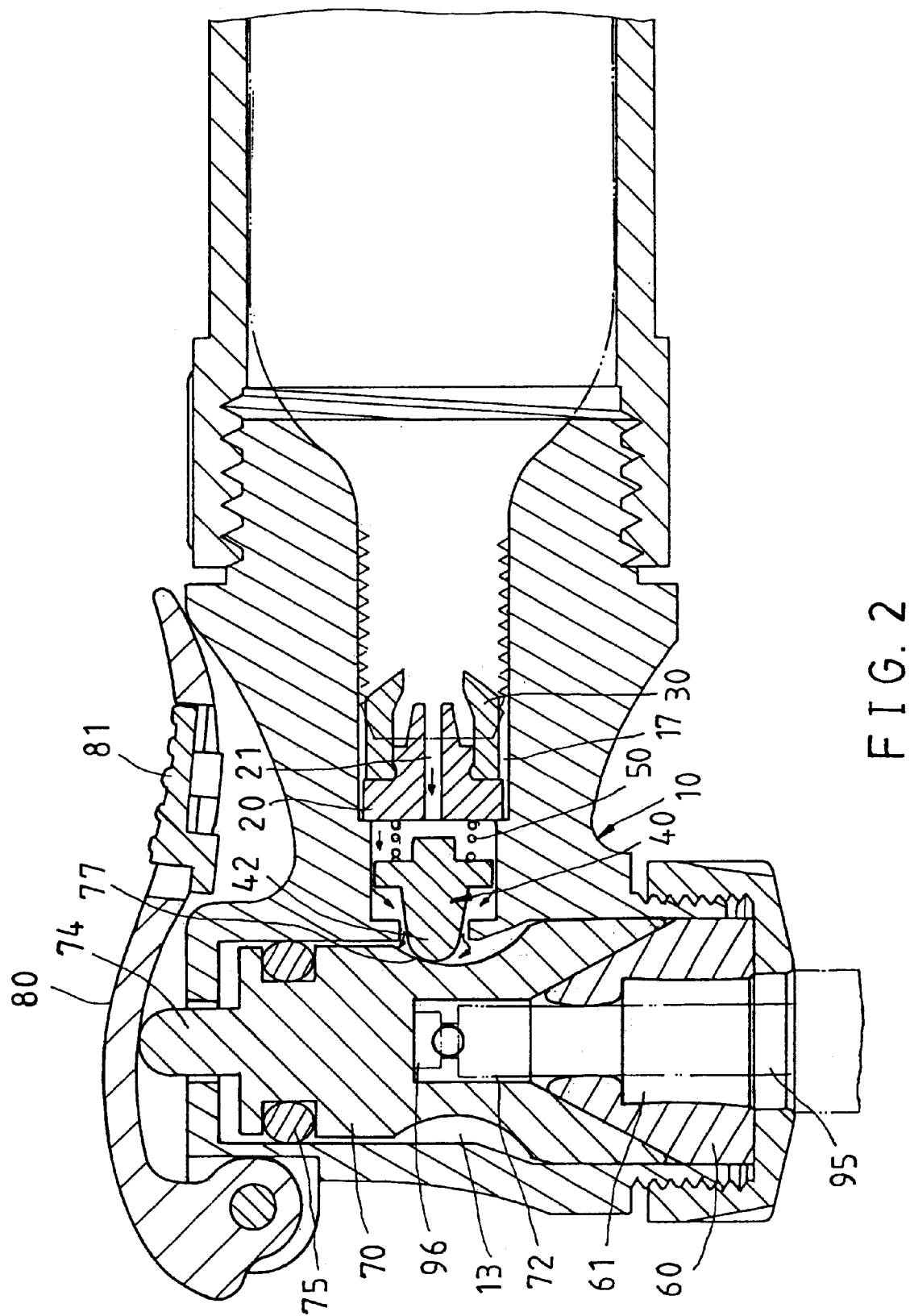
FIG. 2 shows a side sectional schematic view of the present invention in operation.

As shown in FIGS. 1 and 2, an air valve connection head of the present invention is an integral part of an inflation device which comprises an air storage bottle containing the compressed air. The air valve connection head comprises the component parts which are described hereinafter.

A housing 10 has a cylindrical body 11 and a neck 12 connected with the cylindrical body 11 and provided with a receiving compartment 13 which is provided with a through hole 14. The cylindrical body 11 is fastened at the bottom end thereof with an end cover 15 which is provided in the center thereof with an engagement port 16. The neck 12 is provided with an insertion hole 17 extending to the proximity of the receiving compartment 13 such that the axial direction of the insertion hole 17 is perpendicular to the axial direction of the receiving compartment 13, and that the hole end is positioned to cooperate the nozzle of the air storage bottle. The housing 10 has an air hole 18 extending from the inner end of the insertion hole 17 to the receiving compartment 13.

A base block 20 is lodged in the insertion hole 17 and is provided with an air duct 21.

A penetrating member 30 is disposed on the base block 20 and is provided with a pointed portion 31 facing the outer end of the insertion hole 17.

A valve member 40 is disposed in the insertion hole 17 and is provided with a round plate 41 slightly smaller than the hole diameter of the insertion hole 17. The plate 41 is provided with a protuberance 42 extending into the air hole 18 and having a round smooth end. The protuberance 42 has a maximum outer diameter greater than the hole diameter of the air hole 18. The valve member 40 is movably disposed in the insertion hole 17. As the valve member 40 moves to press against the innermost end of the insertion hole 17, the protuberance 42 seals off the air hole 18. In the meantime, the protuberance 42 pierces into the receiving compartment 13, as shown in FIG. 1.

An elastic member 50 is disposed in the insertion hole 17 such that the elastic member 50 urges at one end thereof the base block 20, and at other end thereof the valve member 40. The elastic member 50 of the present invention is a coil spring.

An elastic annular block 60 of a pliable tough rubber material is disposed in the receiving compartment 13 and is provided with a through hole 61 opposite to the engagement port 16. The annular block 60 has a cylindrical bottom which presses against the peripheral surface of the receiving compartment 13. The annular block 60 has a conical top.

A press member 70 is disposed in the receiving compartment 13 and is provided at the bottom thereof with an insertion hole 71 corresponding in form and location to the top of the annular block 60. The press member 70 is joined with the annular block 60 such that the insertion hole 71 receives the top of the annular block 60. The press member 70 is further provided with a cavity 72 located at the inner end of the insertion hole 71, and a guide hole 73 extending from the outer periphery of the press member 70 to be in communication with the cavity 72. The press member 70 is still further provided at the top end thereof with a pillar 74 jutting out of the housing 10 via the through hole 14 of the housing 10. The press member 70 is provided in the proximity of the top thereof with a leakproof ring 75, and an arcuate slot 76 corresponding in location to the air hole 18. When the valve member 40 is located at the innermost end of the insertion hole 17, as shown in FIG. 1, the protuberance 42 is contiguous to the recessed surface of the arcuate slot 76. The arcuate slot 76 is provided in the arcuate surface thereof with an inclined plane 77.

A handle 80 is pivoted at one end thereof to the cylindrical body 11 of the housing 10 and is provided at other end thereof with a switch block 81 which slides between a retaining position, as indicated by the solid lines in FIG. 1, and a retreating position, as indicated by the imaginary lines. When the switch block 81 is located at the retaining position, the bottom end of the switch block 81 presses against the cylindrical body 11. When the switch block 81 is located at the retreating position, the switch block 81 does not press against the cylindrical body 11. The handle 80 has a midsegment, which presses against the pillar 74 of the press member 70.

In operation, a bottle receiving cylinder 92 is so turned that it is connected with the neck 12 of the housing 10, thereby causing the air storage bottle 90 to insert into the insertion hole 17. The sealed opening of the nozzle 91 is pierced by the pointed portion 31 of the penetrating member 30, thereby allowing the compressed air in the air storage bottle 90 to flow into the insertion hole 17 via the air duct 21 of the base block 20. When the inflation device of the present invention is not in operation, the compressed air is prevented from flowing into the receiving compartment 13 in view of the air hole 18 being obstructed by the valve member 40 which is forced by the strong air pressure to displace toward the inner end of the insertion hole 17, as illustrated in FIG. 1. The inflation device of the present invention can not be triggered accidentally by swiveling the switch block 81 of the handle 80 to be located at the retaining position. In light of the switch block 81 urging the housing 10, the handle 10 can not be pressed downwards.

As shown in FIG. 2, a French-type air valve 95 is inserted into the receiving compartment 13 of the engagement port 16 such that the valve bar 96 presses against the cavity 72 via the through hole 61 of the elastic annular block 60. Before inflating the tire, the switch block 81 is swiveled to locate at the retreating position so as to enable the handle 80 to turn downward. As the handle 80 is swiveled downward, the press member 70 is forced to displaced downward to squeeze the elastic annular block 60, which is deformed to lash the nozzle 95. In the meantime, the valve bar 96 is pressed to keep the nozzle 95 open. When the press member 70 displaces downward, the valve member 40 is forced by the inclined plane 77 to retract toward the insertion hole 17, thereby relieving the air hole 18 of the obstruction to allow the compressed air to enter the receiving compartment 13 from which air is guided into the nozzle 95 via the guide hole 73 and the cavity 72. As the handle 80 is let go, the press member 70 is urged by the elastic annular block 60 to return to its original position.

What is claimed is:

1. An air valve connection head of an inflation device provided with an air storage bottle, said air valve connection head comprising:
   a housing provided with a receiving compartment which is provided at one end thereof with an engagement port, and at other end thereof with a through hole, said housing further provided with an insertion hole perpendicular to said receiving compartment and extending from a surface of said housing to the proximity of said receiving compartment for receiving a nozzle of the air storage bottle, said housing further provided with an air hole extending from an inner end of said insertion hole to said receiving compartment;
   a penetrating member provided with a pointed portion and disposed in said insertion hole such that said pointed portion faces an outer end of said insertion hole whereby said pointed portion is used to pierce a sealed end of the nozzle of the air storage bottle;
   a valve member movably disposed in an inner end of said insertion hole and provided with a protuberance facing said air hole, said valve member being forced by the compressed air in the air storage bottle to remain at an innermost end of said insertion hole such that said protuberance obstructs said air hole;
   an elastic annular block provided with a through hole and disposed in said receiving compartment such that said through hole is opposite to said engagement port;
   a press member movably disposed in said receiving compartment such that an inner end of said press member urges said annular block, said press member provided with a cavity opposite to said through hole of said annular block, a guide hole extending from a surface thereof to said cavity, and an inclined plane opposite to air hole whereby said inclined plane forces said valve member to displace toward said insertion hole at the time when said press member displaces toward said annular block; and
   a handle pivoted at one end to said housing such that said handle is swiveled to push via said through hole said press member.

2. The air valve connection head as defined in claim 1 further comprising an elastic member which is disposed in said insertion hole such that one end of said elastic member is fixed, and that other end of said elastic member urges said valve member toward the inner end of said insertion hole.

3. The air valve connection head as defined in claim 2, wherein said elastic member is a coil spring.

4. The air valve connection head as defined in claim 1, wherein said insertion hole is provided with a base block whereby said base block is provided with an air duct; and wherein said penetrating member is connected to said base block.

5. The air valve connection head as defined in claim 1, wherein said insertion hole is provided with a base block having an air duct; wherein said penetrating member is connected to said base block; and wherein said insertion hole is further provided with an elastic member whereby said elastic member urges at one end thereof said base block, and at other end thereof said valve member.

6. The air valve connection head as defined in claim 5, wherein said elastic member is a coil spring.

7. The air valve connection head as defined in claim 1, wherein said handle is provided with a switch block fitted thereover such that said switch block slides between a retaining position and a retreating position, and that said switch block prevents said handle to swivel at the time when said switch block is located at the retaining position.

8. The air valve connection head as defined in claim 1, wherein said air hole is a round hole; wherein said protuberance of said valve member is of a conical construction.

9. The air valve connection head as defined in claim 1, wherein said press member is provided in the periphery with an arcuate slot corresponding to said air hole; wherein said inclined plane is partially formed by said arcuate slot.

10. The air valve connection head as defined in claim 1, wherein said press member has a pillar corresponding to said through hole whereby said pillar is jutted out of said housing via said through hole; wherein said handle presses against said pillar.

11. The air valve connection head as defined in claim 1, wherein said annular block has a conical end corresponding to said press member; wherein said press member has a conical insertion hole for receiving said conical end of said annular block; wherein said cavity is formed at an inner end of said conical insertion hole.

* * * * *